United States Patent
Sebestyen

Patent Number: 5,999,985
Date of Patent: Dec. 7, 1999

[54] METHOD AND APPARATUS FOR STORING, SEARCHING AND PLAYBACK OF ITEMS OF INFORMATION OF A MULTIMEDIA ELECTRONIC MAIL SYSTEM

[75] Inventor: Istvan Sebestyen, München, Germany

[73] Assignee: Siemens Aktiengesellschaft, Munich, Germany

[21] Appl. No.: 08/913,940
[22] PCT Filed: Apr. 9, 1996
[86] PCT No.: PCT/DE96/00617
§ 371 Date: Sep. 23, 1997
§ 102(e) Date: Sep. 23, 1997
[87] PCT Pub. No.: WO96/32802
PCT Pub. Date: Oct. 17, 1996

[30] Foreign Application Priority Data

Apr. 13, 1995 [DE] Germany .......................... 195 14 102

[51] Int. Cl.⁶ ............................. G06F 13/14; H04J 1/08; H04L 5/02
[52] U.S. Cl. ......................... 709/247; 709/231; 370/465
[58] Field of Search ..................... 395/200.77, 200.49, 395/200.61, 114, 888; 341/60; 364/715.02; 348/388; 370/477, 465, 478, 521, 537; 382/232, 233; 709/247, 219, 231

[56] References Cited

U.S. PATENT DOCUMENTS

| | | | |
|---|---|---|---|
| 5,381,412 | 1/1995 | Otani ........................................ | 370/477 |
| 5,392,284 | 2/1995 | Sugiyama ................................. | 370/465 |
| 5,442,749 | 8/1995 | Northcutt et al. .................. | 395/200.49 |
| 5,500,859 | 3/1996 | Sharma et al. ........................... | 370/477 |
| 5,506,844 | 4/1996 | Rao ........................................ | 370/477 |
| 5,694,334 | 12/1997 | Donahue et al. .................. | 395/200.77 |
| 5,754,773 | 5/1998 | Ozden et al. ....................... | 395/200.77 |
| 5,784,572 | 7/1998 | Rostoker et al. ................... | 395/200.77 |
| 5,796,957 | 8/1998 | Yamamoto et al. ................ | 395/200.77 |
| 5,838,917 | 11/1998 | Paolini ............................... | 395/200.49 |

FOREIGN PATENT DOCUMENTS

| | | |
|---|---|---|
| 1 0 523 629 | 1/1993 | European Pat. Off. . |
| 20 535 890 | 4/1993 | European Pat. Off. . |
| 2 0 630 141 | 12/1994 | European Pat. Off. . |
| WO-A 96/03837 | 2/1996 | WIPO . |

OTHER PUBLICATIONS

R. Schaphorst, Status of H.324–the videoconferencing standard for the Public Switched Telephone Network and mobile radio, Optical Engineering, vol. 35, No. 1, Jan., 1996, pp. 109–112.

P. Tsang, et al., The Multimedia Information Link Control, Proceedings Tencon 93–IEEE Region 10 Conference on Computer, Communication, Control and Power Engineering, vol. 1, Oct. 19–21, 1993, Beijing, pp. 70–73.

R. Hinz, Kommunikationsprotokoll für Bildtelefon–Endeinrichtungen, NTZ Nachrichtentechnische Zeitschrift, vol. 44, No. 12, Dec., 1991, Berlin, pp. 880–883.

*Primary Examiner*—Mark H. Rinehart
*Assistant Examiner*—Marc D Thompson
*Attorney, Agent, or Firm*—Hill & Simpson

[57] ABSTRACT

Method and apparatus for storing, searching and playback of highly compressed audiovisual items of information and data files of a multimedia electronic mail system, using a protocol for multimedia multiplexing and multimedia control, with a control for the multimedia information streams in a separate virtual control channel according to ITU-T H.245, with multiplexers or, respectively, demultiplexers for information according to ITU-T H.223, with a video compression and coding means or, respectively, video decompression and decoding means, e.g. according to ITU-T H.263, with an audio/speech compression and audio/speech decompression means for compression or, respectively, decompression, using a high-compression speech compression algorithm, with at least one network access and with a control for controlling the multimedia electronic mail system via a separate logical control channel.

30 Claims, 2 Drawing Sheets

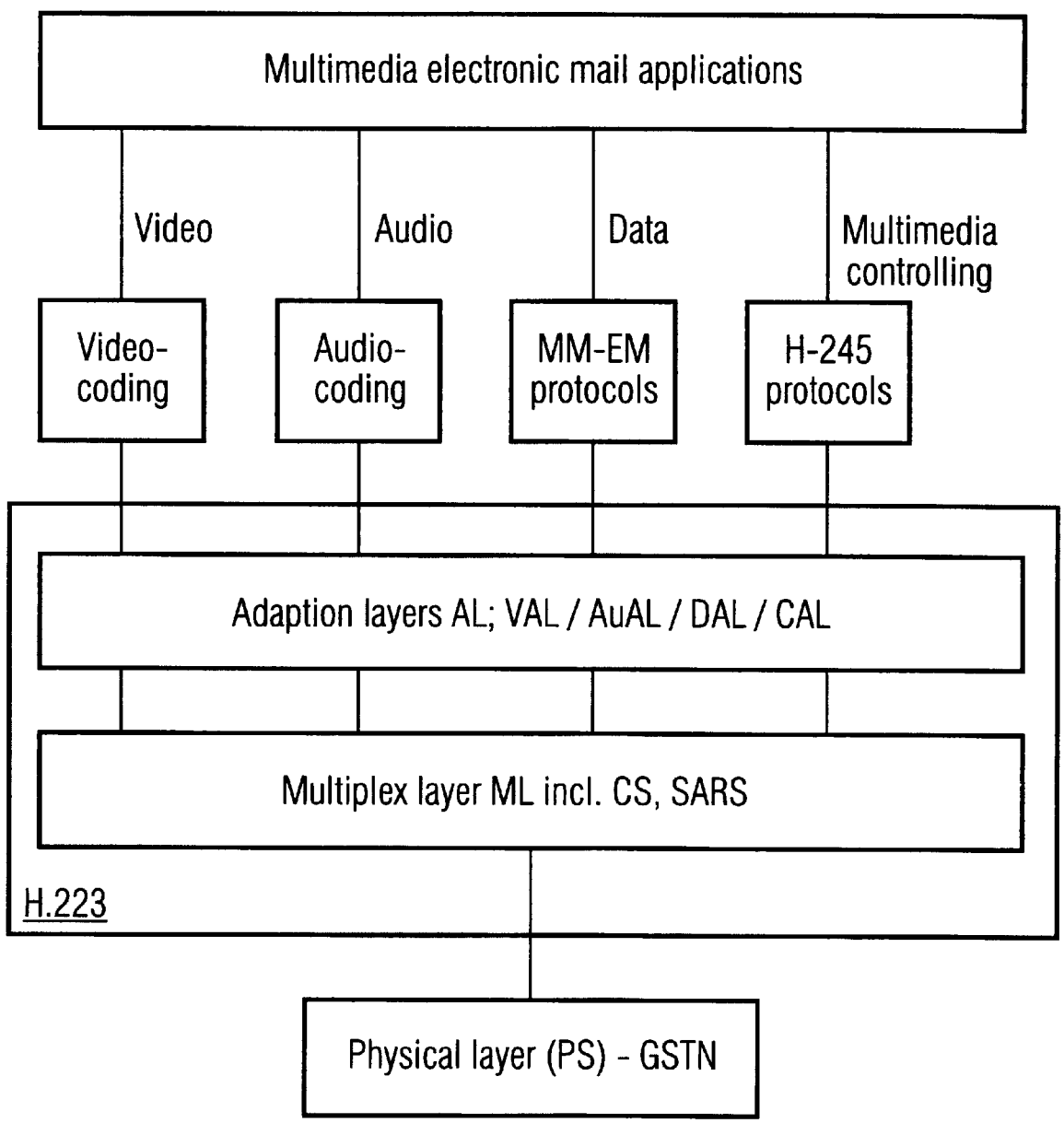

METHOD AND APPARATUS FOR STORING, SEARCHING AND PLAYBACK OF ITEMS OF INFORMATION OF A MULTIMEDIA ELECTRONIC MAIL SYSTEM

BACKGROUND OF THE INVENTION

The storing and playing back of multimedia items of information (video, audio, data, and control items of information) on digital storage media is one of the most important functions in a multimedia electronic mail system, also called an electronic multimedia mail system. In a multimedia electronic mail system, each subscriber is provided with a separate electronic mail compartment (called a mailbox), in which messages sent by other mail subscribers are deposited as multimedia mail messages. Each subscriber can fetch the separate multimedia mail from his mail compartment at any time.

The electronic mail compartments are installed on large digital mass memories. Although the capacity of storable items of information on digital storage media is constantly growing, the large quantity of data of multimedia items of information continues to present a massive storage problem.

In relation to the known methods, the present inventive method leads to a substantially higher compression and to a more effective multiplexing of multimedia data streams in a multimedia electronic mail system (see Table 1).

In contrast, the method known as MPEG-1 (ISO/IEC 11172), with 1.5 Mbit/s, requires about 11 Mbytes of memory space for the storing of a multimedia message of one minute. Seen from the perspective of memory volume, the currently known methods for multimedia electronic mail are hardly suitable in practice.

TABLE 1

Examples for the storage of multimedia mail messages

| Medium | Memory volume (Mbytes): | Playback time with 32 kbit/s standard QCIF (180 × 144) image resolution of H.263; G.723.1; 64 kbit/s audio | Playback time with 128 kbit/s non-standard CIF (360 × 288) image resolution of H.263; G.723.1; G.728; G.729 audio | Playback time with 512 kbit/s non-standard ITU-R 601 (720 × 576) image resolution of H.263; G.728, G.729; G.722 audio; ISO/IEC 11172-3 |
|---|---|---|---|---|
| Hard disk/minute (average for a multimedia mail message | — | about 240 kbyte/min | about 1 Mbyte/min | about 4 Mbyte/min |
| Sample hard disk: | 1,000 | about 4,000 MM messages | about 1,000 MM messages | about 250 MM messages |

A further advantage of inventive video and audio methods in relation to the known methods is that they relate to "symmetrical real-time compression/decompression methods." The symmetry holds both for the complexity of the coder, or, respectively, of the decoder, and for the time characteristic of the coding and decoding (i.e., the complexity of the coder and of the decoder are approximately equal, or, respectively, the time expense for the coding and decoding are also approximately equal and isochronous).

The quality of the MPEG-1 video and of the MPEG-1 audio is indeed better than that of the methods listed in Table 1, but what are thereby concerned are asymmetrical methods, which require a tedious and complicated coding. The only advantage lies in the simpler decoding. However, there are numerous applications in which a reduced video and audio quality is entirely sufficient (e.g., multimedia mail, video images with head and shoulders), in which, however, a real-time coding/decoding is required, with approximately equal coding/decoding complexity.

In the present invention, a terminal for electronic multimedia mail, an ITU-T H.324 videotelephone apparatus is proposed (FIG. 1). An advantage of the videotelephone terminal is that it already contains elements of the system, such as for example audio codec, video codec, multimedia multiplexer, multimedia control, which can be of benefit to the electronic multimedia mail system. It is true that the H.324 videotelephone is tailored to a GSTN, thus to an analog telephone network. However, the invention can also be used on other networks, in particular mobile communication networks and ISDN networks. For the terminal access to the electronic multimedia mail system, in the H.324 videotelephone an additional data channel is opened, in addition to the control channel for video, speech and H.245 videotelephone. This data channel serves for controlling and communication between the terminal of the electronic multimedia mail system and the electronic mail system. In this data channel, e.g. the X.400 commands or, respectively, the X.500 commands are exchanged, using X.400 protocols and X.500 protocols, and the electronic multimedia mail system is operated.

After the connection setup between a terminal and the multimedia electronic mail system, both terminal units must mutually indicate (e.g. using ITU-T H.245) whether the one videotelephone is at the same time also a terminal for the multimedia electronic mail system, and whether the other terminal unit is the multimedia electronic mail system. If yes, then, using ITU-T H.245, either an additional data channel is opened for the operation of the multimedia electronic mail system, or in the audio channel the controlling of the multimedia electronic mail system is controlled using audible DTMF signals.

Via this data channel, the selection (login of the user) to the electronic mail system and the inputting of the password is actuated from the terminal.

If the user of the electronic mail is accepted by the system as authorized for access, he can carry out various mail system functions, e.g., querying the separate electronic mail compartment for new multimedia items of information, and fetching these if any such are present.

During fetching, the electronic mail system is the transmitter. The required multimedia channels are also selected and controlled for this purpose using a method according to H.245. The receiving multimedia terminal (videotelephone) isochronously indicates, e.g., the video image, and outputs the associated speech information.

During the sending out of a multimedia message, the required multimedia channels are opened in the separate multimedia control channel using a procedure according to ITU-T H.245. Subsequently, the address of the addressee is input into the separate control channel for the multimedia electronic mail. Next, the videotelephone terminal serves as an input means for the multimedia electronic mail. As a rule, a camera takes the picture, a microphone records the sound or, respectively, the voice of the speaker, and the H.223 multiplexer assembles the video and audio items of information. The multimedia electronic mail system stores the multimedia mail in the desired mail compartment of the addressee.

Dependent on the individual embodiments and special features, the invention preferably makes use of the following information technology standards and/or communication technology standards:

- The present standardization in the ITU-T of speech coders with very low bit rates for videotelephony (ITU-T G.723) in the public telephone dialing network (GSTN) leads to qualitatively good speech coders (approximating the quality of the CCITT G.726 recommendation) with transmission speed of 5.3–6.3 kbit/s. The ITU-T G.729 speech coder also enables a digital speech transmission with a speed of 8 kbit/s. In the future, a 4 kbit/s coder will also be standardized (ITU-T G.4 kbit/s).
- The present standardization in the ITU-T of moving image coders with very low bit rates, e.g. for videotelephony in the public telephone dialing network (ITU-T H.263), leads to qualitatively good (QCIF resolution (180×144) and lower) moving image coders with the necessary transmission speed of 8–24 kbit/s or a still higher transmission speed, which require a secured type of transmission (e.g., with ITU-T H.223). An increase of the image resolution over the values defined in the standard, e.g. to CIF (360×288) or ITU-T 601 (720×576), enables the transmission of moving images with television studio quality or, respectively, with digital studio quality.
- The present ITU-T standardization of multiplexers (ITU-T H.223) of the audiovisual information types with very low bit rates, e.g. for videotelephony in the public telephone dialing networks, with transmission speed of 9.6–32 kbit/s or higher, enables a secured type of transmission (H.223).
- The present ITU-T standardization (ITU-T H.245) relating to the controlling of audiovisual types of data with very low bit rates, for example for videotelephony in public telephone dialing networks, which enables a flexible allocation of up to 15 independent useful channels, respectively with audio/speech information, video information, or data information. Each channel is provided with a flexible bandwidth, which can vary arbitrarily from application to application in the running of the multimedia electronic mail application.
- The concluded standardization of the ITU-T for electronic mail (recommendations of the ITU-X.400 series and ITU-T X.500 series).

These and other features of the invention are discussed in greater detail below in the following detailed description of the presently preferred embodiments with reference to the accompanying drawings.

BRIEF DESCRIPTION OF THE DRAWINGS

FIG. 2 illustrates a multimedia multiplexing scheme.

DETAILED DESCRIPTION OF THE PRESENTLY PREFERRED EMBODIMENTS

Figure 1:
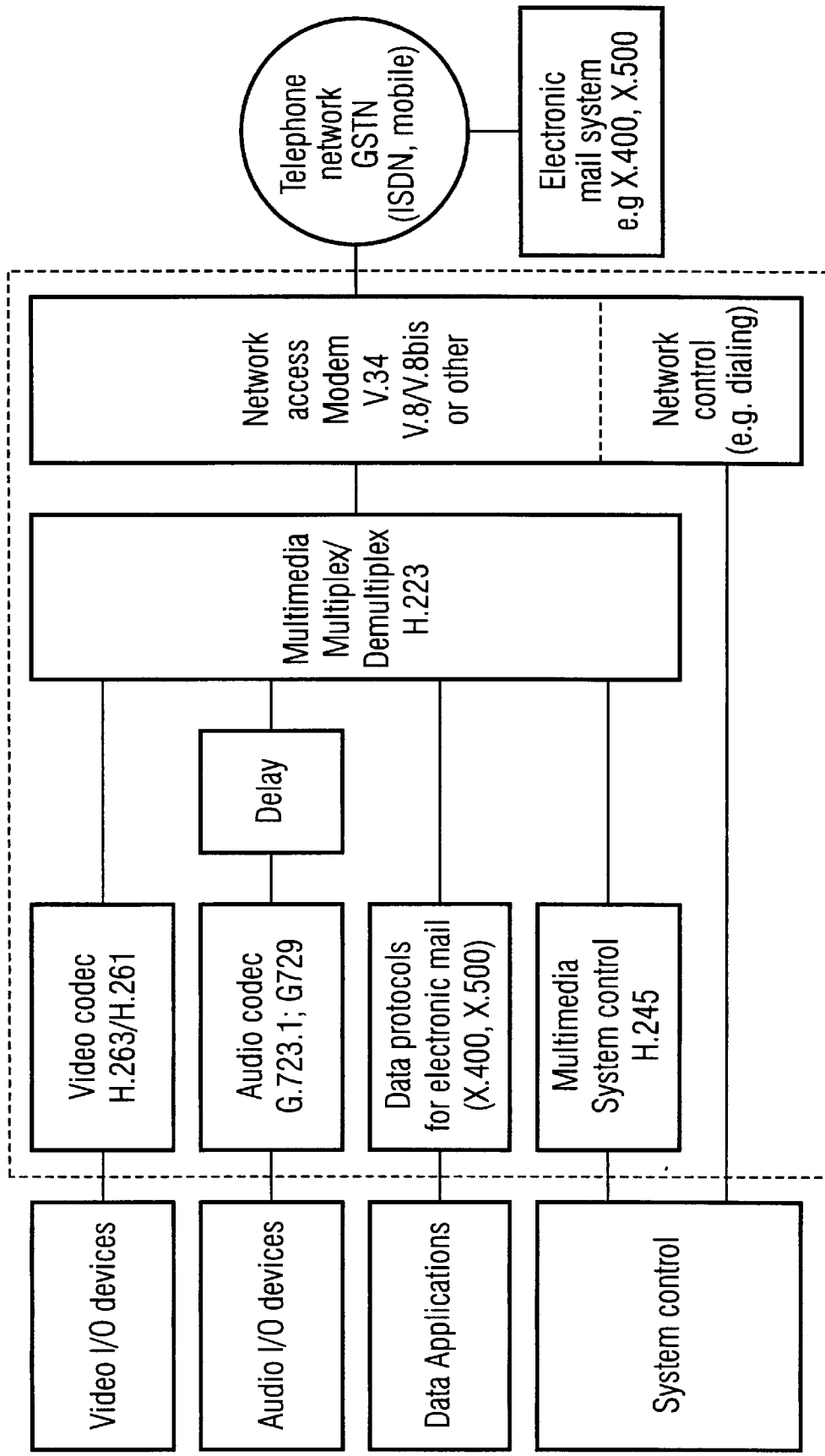
FIG. 1 illustrate the block diagram of an exemplary embodiment of an inventive multimedia electronic mail system.

A multimedia electronic mail system consists of several functional units. The video I/O apparatuses (input/output) contain for example a camera, a display screen and an image preparation unit for mixing in several images (split screen). In an advantageous construction, all the apparatuses can actually be connected. The audio/speech I/O apparatuses include the microphone (or several), the loudspeaker (or several), and the audio/speech preparation unit (e.g., for echo suppression). Here as well, in an advantageous construction all the apparatuses can actually be connected. The system controlling controls the overall system, i.e., it provides for the multimedia controlling for the multimedia multiplexer and for the overall multimedia system controlling. The video codec provides for the digital compression and decompression of the video signal at the video encoder or, respectively, video decoder. The audio/speech codec provides for the digital compression/decompression of the audio/speech signal. An optional delaying of the speech signal is used to achieve lip synchronization between video and speech. In multimedia storing, the multiplexer/demultiplexer merges the audio, video and data signals to form a common data stream, or, respectively, extracts separate audio, video and data signals from the common multimedia data stream in fetching from the multimedia electronic mail compartment.

The system controlling consists of the controlling of the multimedia multiplexing (according to ITU-T H.245) and the controlling of the overall multimedia electronic mail system.

In the multimedia multiplexing according to ITU-T H.245, up to 15 useful channels can be opened and used. Before the storing of the useful channels, the user parameters are settled on and are set according to H.245. The data memory of the electronic mail thereby indicates the broadest possibility of the storing of multimedia items of information, and it is the storing application that finally decides and makes the selection of which multimedia channels are to be opened and how the multimedia storing in the data memory is to take place.

In the storing of a typical audiovisual message (multimedia mail), for example one channel is opened for video, one channel for speech, one data channel for multimedia mail control (addressing, time of the multimedia post depositing, etc.), and the obligatory ITU-T H.245 multimedia control channel is opened.

Before the playing back of the useful channels from the electronic mail compartment, there also ensues a settling on and setting of the user parameters according to ITU-T H.245. The multimedia electronic mail system thereby indicates the broadest possibility of storing multimedia items of information, and it is in turn the playback application that finally decides and makes the selection of which multimedia channels are to be opened, and how the multimedia playback from the mail system is to ensue.

FIG. 2 shows the multimedia multiplexing. The lowest layer (PS) is the physical layer. This represents the network transition, thus the interface between the videotelephone multimedia multiplexing and the network (GSTN, but in principle also other networks, such as ISDN and mobile networks). The multiplexer is provided with two layers: what is known as an adaptation layer (adaptation layer—AL) and a multiplex layer (multiplex layer—ML). The adaptation layer is responsible for the adaptation of the diverse information streams, which come from the various media sources (video, audio/speech, data), to the MUX layer. FIG. 2 specifies four adaptation layers: data adaptation layer (data adaptation layer—DAL), audio/speech adaptation layer (audio adaptation layer—AuAL), video adaptation layer (video adaptation layer—VAL) and control adaptation layer (control adaptation layer—CAL) for the transmission of multimedia control data.

Each adaptation layer makes use of functions of the Mux layer: what is known as a convergence sublayer (convergence sublayer—CS) and what is known as a segmentation/reassembly sublayer (segmentation and reassembly sublayer—SARS). The convergence sublayer CS provides for error recognition, and (where desired) for error correction. The SARS provides for the fragmentation of the data streams into what are known as SAR-SDUs (SDU—service data unit), tailored to the MUX layer.

The video codec (Video), which codes or, respectively, decodes the video items of information, is located above the video adaptation layer. The audio codec Audio, which codes or, respectively, decodes the audio items of information, is located above the audio adaptation layer. The data protocols required for the data application "electronic mail" are located above the data adaptation layer DAL. A separate, special data channel allocated to the ITU-T H.245 multimedia control protocols.

When stored in the electronic mail system, the adaptation layers indicate transmission errors, and error corrections are initiated. The adaptation layers further fragment the information streams into smaller units. The MUX layer provides for the multiplexing of the various types of information prepared by the adaptation layers. Furthermore, the segmenting/reassembly of the data is carried out.

Upon access/playback of the multimedia message from the electronic mail system, the MUX layer provides for the demultiplexing of the arrived data stream into data fragments of the various information types, which are forwarded to the respectively responsible adaptation layers. The adaptation layers assemble the individual data streams from the data fragments, which streams are forwarded to the applications of the electronic mail system (speech/audio, video, data, control).

Although modifications and changes may be suggested by those skilled in the art, it is the intention of the inventors to embody within the patent warranted hereon all changes and modifications as reasonably and properly come within the scope of their contribution to the art.

I claim:

1. A method for storing, search and playback of highly compressed audiovisual items of information and data files of an electronic multimedia mail system, using a protocol for multimedia multiplexing and multimedia control, comprising the following steps:
    a) controlling multimedia streams of information in a first separate virtual control channel according to ITU-T H.245 in order to enable flexible allocation and simultaneous processing of several audio/speech, video and data channels for multimedia communication;
    b) multiplexing or, respectively, demultiplexing video items of information and/or audio/speech items of information and/or data items of information and/or control information according to ITU-T H.223 in order to enable flexible allocation of channel capacities corresponding to the current needs of the channels allocated in the named controlling;
    c) compressing and coding, or, respectively, decompressing and decoding video signals;
    d) compressing or, respectively, decompressing the audio or, respectively, speech signals using a high-compression speech compressing algorithm;
    e) controlling the electronic multimedia mail system via a second separate virtual control channel.

2. Apparatus for storing, search and playback of highly compressed audiovisual items of information and data files of an electronic multimedia mail system, using a protocol for multimedia multiplexing and multimedia control, comprising:
    an information stream controller for controlling the multimedia information streams in a separate virtual control channel according to ITU-T H.245, in order to enable flexible allocation and the simultaneous processing of several audio/speech channels, video channels and data channels for multimedia communication;
    a multiplexer and demultiplexer for multiplexing or, respectively, demultiplexing of video items of information and/or audio/speech items of information and/or data items of information and/or control information according to ITU-T H.223, in order to enable a flexible allocation of channel capacities corresponding to the current needs of the channels allocated by the named controller;
    a video compression and coding means for the compressing and coding of video signals, and with a video decompression and decoding means for the decompressing and decoding of video signals, preferably according to ITU-T H.263;
    an audio/speech compression and audio/speech decompression means for the compression or, respectively, decompression of audio signals or, respectively, speech signals with a high-compression speech compression algorithm;
    a system control for controlling the electronic multimedia mail system via a second separate virtual control channel; and
    at least one communication network access.

3. An apparatus according to claim 2, characterized in that the second separate virtual control channel is an additionally opened virtual data channel according to ITU-T H.245.

4. An apparatus according to claim 2, characterized in that the audio/speech compression and audio/speech decompression means can be operated at least with a speech compression algorithm according to a standard selected from the group consisting of ITU-T G.723.1, ITU-T G.729, ITU-T G.728, ITU-T G.722, ISO/IEC 11172-3 and ITU-T G.4 kbit/s.

5. An apparatus according to claim 2, characterized by a network access for an analog telephone network with ITU-T V.34 and ITU-T V. 8bis.

6. An apparatus according to claim 2, characterized by at least one network access for a mobile radiotelephone network.

7. An apparatus according to claim 2, characterized by at least one network access for a service-integrating digital network.

8. An apparatus according to claim 2, characterized in that the second separate virtual control channel is realized using multifrequency tone signals in the audio channel.

9. An apparatus according to claim 2, characterized in that the audio/speech compression and audio/speech decompression means can be operated at least with a speech compression algorithm according to a standard selected from the group consisting of ITU-T G.723.1, ITU-T G.729, ITU-T G.728, ITU-T G.722, ISO/IEC 11172-3 and ITU-T G.4 kbit/s.

10. An apparatus according to claim 3, characterized in that the audio/speech compression and audio/speech decompression means can be operated at least with a speech compression algorithm according to a standard selected from the group consisting of ITU-T G.723.1, ITU-T G.729, ITU-T G.728, ITU-T G.722, ISO/IEC 11172-3 and ITU-T G.4 kbit/s.

11. An apparatus according to claim 3, characterized by a network access for an analog telephone network with ITU-T V.34 and ITU-T V.8bis.

12. An apparatus according to claim 4, characterized by a network access for an analog telephone network with ITU-T V.34 and ITU-T V.8bis.

13. An apparatus according to claim 3, characterized by at least one network access for a mobile radiotelephone network.

14. An apparatus according to claim 4, characterized by at least one network access for a mobile radiotelephone network.

15. An apparatus according to claim 5, characterized by at least one network access for a mobile radiotelephone network.

16. An apparatus according to claim 3, characterized by at least one network access for a service-integrating digital network.

17. An apparatus according to claim 4, characterized by at least one network access for a service-integrating digital network.

18. An apparatus according to claim 5, characterized by at least one network access for a service-integrating digital network.

19. An apparatus according to claim 6, characterized by at least one network access for a service-integrating digital network.

20. An apparatus according to claim 3, characterized in that the second separate virtual control channel is realized using multifrequency tone signals in the audio channel.

21. An apparatus according to claim 4, characterized in that the second separate virtual control channel is realized using multifrequency tone signals in the audio channel.

22. An apparatus according to claim 5, characterized in that the second separate virtual control channel is realized using multifrequency tone signals in the audio channel.

23. An apparatus according to claim 6, characterized in that the second separate virtual control channel is realized using multifrequency tone signals in the audio channel.

24. An apparatus according to claim 7, characterized in that the second separate virtual control channel is realized using multifrequency tone signals in the audio channel.

25. An apparatus according to claim 3, characterized in that the audio/speech compression and audio/speech decompression means can be operated at least with a speech compression algorithm according to a standard selected from the group consisting of ITU-T G.723.1, ITU-T G.729, ITU-T G.728, ITU-T G.722, ISO/IEC 11172-3 and ITU-T G.4 kbit/s.

26. An apparatus according to claim 4, characterized in that the audio/speech compression and audio/speech decompression means can be operated at least with a speech compression algorithm according to a standard selected from the group consisting of ITU-T G.723.1, ITU-T G.729, ITU-T G.728, ITU-T G.722, ISO/IEC 11172-3 and ITU-T G.4 kbit/s.

27. An apparatus according to claim 5, characterized in that the audio/speech compression and audio/speech decompression means can be operated at least with a speech compression algorithm according to a standard selected from the group consisting of ITU-T G.723.1, ITU-T G.729, ITU-T G.728, ITU-T G.722, ISO/IEC 11172-3 and ITU-T G.4 kbit/s.

28. An apparatus according to claim 6, characterized in that the audio/speech compression and audio/speech decompression means can be operated at least with a speech compression algorithm according to a standard selected from the group consisting of ITU-T G.723.1, ITU-T G.729, ITU-T G.728, ITU-T G.722, ISO/IEC 11172-3 and ITU-T G.4 kbit/s.

29. An apparatus according to claim 7, characterized in that the audio/speech compression and audio/speech decompression means can be operated at least with a speech compression algorithm according to a standard selected from the group consisting of ITU-T G.723.1, ITU-T G.729, ITU-T G.728, ITU-T G.722, ISO/IEC 11172-3 and ITU-T G.4 kbit/s.

30. An apparatus according to claim 8, characterized in that the audio/speech compression and audio/speech decompression means can be operated at least with a speech compression algorithm according to a standard selected from the group consisting of ITU-T G.723.1, ITU-T G.729, ITU-T G.728, ITU-T G.722, ISO/IEC 11172-3 and ITU-T G.4 kbit/s.

* * * * *